United States Patent
Schorling (10) Patent No.: US 11,834,905 B2
(45) Date of Patent: Dec. 5, 2023

(54) CORDLESS ROLLER BLIND

(71) Applicant: ZHEJIANG HD4U SMART HOME CO., LTD, Haining (CN)

(72) Inventor: Stefan Herman Georg Schorling, Haining (CN)

(73) Assignee: ZHEJIANG HD4U SMART HOME CO., LTD, Haining (CN)

( * ) Notice: Subject to any disclaimer, the term of this patent is extended or adjusted under 35 U.S.C. 154(b) by 554 days.

(21) Appl. No.: 16/968,601

(22) PCT Filed: Sep. 12, 2018

(86) PCT No.: PCT/CN2018/105199
§ 371 (c)(1),
(2) Date: Sep. 4, 2020

(87) PCT Pub. No.: WO2019/153740
PCT Pub. Date: Aug. 15, 2019

(65) Prior Publication Data
US 2021/0238922 A1    Aug. 5, 2021

(30) Foreign Application Priority Data
Feb. 9, 2018 (CN) .......................... 201810137020.1

(51) Int. Cl.
*E06B 9/90* (2006.01)
*E06B 9/42* (2006.01)
(Continued)

(52) U.S. Cl.
CPC ................. *E06B 9/90* (2013.01); *E06B 9/42* (2013.01); *F16D 55/02* (2013.01); *F16D 59/00* (2013.01); *F16D 2127/005* (2013.01)

(58) Field of Classification Search
CPC ... E06B 9/90; E06B 9/42; F16D 55/02; F16D 59/00; F16D 2127/005
See application file for complete search history.

(56) References Cited

U.S. PATENT DOCUMENTS

| 8,844,605 B2 | 9/2014 | Ng |
| 9,523,236 B2 * | 12/2016 | Bergamaschi ............ E06B 9/90 |
| 2016/0369558 A1 * | 12/2016 | Kirby ........................ E06B 9/42 |

FOREIGN PATENT DOCUMENTS

| CN | 2352660 Y | 12/1999 |
| CN | 2840111 Y | 11/2006 |

(Continued)

*Primary Examiner* — Beth A Stephan
(74) *Attorney, Agent, or Firm* — Bayramoglu Law Offices LLC (57) ABSTRACT

A cordless roller blind includes a roller tube, a blind fabric wound around the roller tube, and at least one brake device. A coil spring is arranged in the roller tube, and the torsion of the coil spring changes as the roller tube rotates. The torsion force of the coil spring, the friction force provided by the brake device and the weight of a hanging portion of the blind fabric are mutually balanced, so that the blind fabric remains stationary at any position without an external force. When the external force pushes the blind fabric to move upward, pressure acting on the brake device decreases as the external force offsets the weight of the blind fabric, and the friction decreases accordingly, and the torsion force of the coil spring drives the blind fabric to wind up.

18 Claims, 5 Drawing Sheets

(51) Int. Cl.
*F16D 55/02* (2006.01)
*F16D 59/00* (2006.01)
*F16D 127/00* (2012.01)

(56) References Cited

FOREIGN PATENT DOCUMENTS

| | | |
|---|---|---|
| CN | 201074473 Y | 6/2008 |
| CN | 203978250 U | 12/2014 |
| CN | 108266115 A | 7/2018 |

* cited by examiner

CORDLESS ROLLER BLIND

CROSS REFERENCE TO THE RELATED APPLICATIONS

This application is the national phase entry of International Application No. PCT/CN2018/105199, filed on Sep. 12, 2018, which is based upon and claims priority to Chinese Patent Application No. 201810137020.1, filed on Feb. 9, 2018, the entire contents of which are incorporated herein by reference.

TECHNICAL FIELD

The present invention relates to window coverings, and more particularly, to a cordless roller blind.

BACKGROUND

Roller blinds in the prior art include the mechanical roller blind and the power-driven roller blind. The mechanical roller blind realizes the winding and self-locking of the roller tube in the desired position to fix the blind fabric in place by way of a bead chain. In use, the bead chain of the mechanical roller blind must be pulled forcefully, which often breaks the bead chain. As a result, the roller blind can no longer be used. When the blind fabric is lowed, the weight of the blind fabric causes some torque to the roller tube. In the process of self-locking, the clutch of the roller blind is always subjected to the torque, which is easy to damage the clutch of the roller blind. In addition, the bead chain or cord of the mechanical roller blind is not aesthetically appealing and has been known to become entangled around the neck of pets, as well as children, causing injury and death. The power-driven roller blind is driven by a motor. The motor rotates to drive the roller tube to rotate, and the rotating shaft of the motor is used to limit the self-locking position of the roller. The weight of the blind fabric causes some torque to the roller, and this torque is fully displaced on the main shaft of the motor, which causes a load on the motor.

SUMMARY

In order to solve the above problems, the present invention provides a new cordless roller blind. The new cordless roller blind can be manually raised and lowered as required in use and self-locked in the desired position, and the roller tube and a limit component of the cordless roller blind are not subjected to excessive torque during the self-locking process to avoid irreversible damage.

The objective of the present invention is realized by the following technical solution. A cordless roller blind includes a roller tube, a blind fabric wound around the roller tube, and at least one brake device. A coil spring is arranged in the roller tube, and a torsion force of the coil spring changes as the roller tube rotates. The torsion force of the coil spring, friction provided by the brake device and a weight of a hanging portion of the blind fabric balance at equilibrium, and the blind fabric remains stationary at any position without an external force. The blind fabric is wound through the roller tube, and when the blind fabric needs to be wound, the blind fabric is raised. The external force applied to the blind fabric overcomes the balanced condition, equilibrium of the torsion force, the friction and the weight, and the roller tube rotates to drive the blind fabric to be wound around the roller tube to retract the blind fabric.

When the blind fabric is held in place, the external force is removed, and thus the blind fabric is rebalanced by the torsion force, the friction and the weight and remains stationary. When the blind fabric needs to be lowered, similar to the situation of raising the blind fabric, the balance is first upset through an external force, and the blind fabric moves down. When the blind fabric is held at the desired position, the torque of the coil spring, the friction provided by the brake device and the weight of the hanging portion of the blind fabric reach a balance, so that the blind fabric is self-locked in the desired position. With respect to the whole roller blind, the blind fabric can be lowered as required in use, and after being lowered to the desired position, the blind fabric can be self-locked.

In the locking process, the torque of the coil spring, the friction provided by the brake device, and the weight of the hanging portion of the blind fabric are balanced to prevent other components of the roller blind from being loaded. The maximum static friction of the brake device is constant. The static balance is broken by the external force, and the stationary state is adjusted to a state in which the blind fabric can move up and down. After the external force is removed, the torsion force of the coil spring, the friction provided by the brake device and the weight of the hanging portion of the blind fabric are mutually rebalanced. At this time, the friction provided by the brake device is not greater than the maximum static friction of the brake device, that is to say, in each stationary position, the friction provided by the brake device is determined according to the weight of the blind fabric and the torsion force of the coil spring in the stationary position. The friction, however, is always less than the maximum static friction of the brake device, so that the blind fabric is held stationary in any position without the external force. When an external force is applied to the blind fabric, the external force is greater than the maximum static friction, the stationary state of the blind fabric is changed, and the blind fabric performs winding. When the external force disappears, the friction of the brake device makes the blind fabric stationary again. The direction of the torsion force of the coil spring is always opposite to the direction of the weight of the hanging portion of the blind fabric, and the direction of the friction is determined according to the difference between the torsion force and the weight.

For different roller blinds, the brake device can be adjusted before installation. Preferably, the friction of the brake device can be adjusted, and the friction in the brake device can be adjusted according to weight of different blind fabrics. The weights of the blind fabrics are different due to the difference of the fabric of the blind fabrics. The friction of the brake device is set according to the weight. The friction and the torque generated by the coil spring can be adjusted manually according to the weight of the hanging portion of the blind fabric.

When the blind fabric is not changed, the friction of the brake device is variable in a winding process of the blind fabric. When the external force pushes the blind fabric to move upward, pressure acting on the brake device decreases as the external force offsets the weight of the blind fabric, and the friction decreases accordingly. The torsion force of the coil spring drives the blind fabric to wind up. After the external force is removed, the friction increases, and then the friction, the torsion force of the coil spring and the weight of the hanging portion of the blind fabric reach a balance, so that the blind fabric remains stationary.

Preferably, the brake device includes a rotating disc and a positioning disc in the rotating disc. The rotating disc rotates relative to the positioning disc, and the friction of the brake device is derived from friction between the rotating disc and the positioning disc after a mechanical contact between the rotating disc and the positioning disc. The rotating disc is connected to the roller tube, and the roller tube rotates to drive the rotating disc to rotate. When the blind fabric on the roller tube is lowed or raised, the pressure acting on the roller tube changes with the external force and the weight of the blind fabric on the roller tube, so that the pressure of the contact portion between the rotating disc and the positioning disc changes, which brings about a change in the friction between the rotating disc and the positioning disc. In the absence of the external force, the friction, the torsion force and the weight are balanced.

Preferably, the positioning disc is made of at least one wear-resistant material with a friction coefficient. The friction between the positioning disc and the rotating disc depends on the friction coefficient of the material of a portion of the positioning disc in contact with the rotating disc. As the blind fabric is lowed or raised, the rotating disc rotates with the roller tube provided with the roller blind, and the contact position between the rotating disc and the positioning disc changes in the movement process of the blind fabric. Due to the different materials of the positioning disc, the friction at the different contact positions is changeable. The different friction coefficients can be determined by selecting the materials of different positioning discs, so that the friction is determined to meet the requirements of self-locking.

Preferably, the brake device includes a rotating disc and a positioning disc in the rotating disc. At least one friction member is arranged between the positioning disc and the rotating disc. The rotating disc rotates relative to the positioning disc. The friction of the brake device includes friction between the rotating disc and the friction member and friction between the rotating disc and the positioning disc. The friction between the rotating disc and the positioning disc is greater than or equal to zero. The friction of the brake device is adjusted by changing a relative angle between the rotating disc and the positioning disc. The friction is easily adjusted by replacing the friction member, and the friction member can also be replaced quickly after wear, which has a low cost. The friction member can be a friction ring fixed in the positioning disc.

During the installation process of the brake device of the roller blind, the rotating disc and the positioning disc are concentrically arranged. After the rotating disc is inserted into the end of the roller tube, the weight of the blind fabric on the roller tube provides downward pressure to the rotating disc, so that the rotating disc is eccentric with the positioning disc and the rotating disc is in contact with the positioning disc or the friction member, thus generating the friction of the brake device.

Preferably, a friction coefficient of the positioning disc is different from a friction coefficient of the friction member. When the rotating disc is rotated, the rotating disc is contact with the positioning disc and the friction member. Since the friction coefficient of the positioning disc is different from the friction coefficient of the friction member, the friction between the rotating disc and the positioning disc is different from the friction between the rotating disc and the friction member. When the rotating disc is rotated by different angles, the contact area between the rotating disc and the positioning disc is different from the contact area between the rotating disc and the friction member, so that the friction of the brake device is different. The friction between the rotating disc and the positioning disc may be greater than the friction between the rotating disc and the friction member.

Alternatively, the friction between the rotating disc and the positioning disc may be smaller than the friction between the rotating disc and the friction member.

Preferably, the brake device further includes a first positioning plate. The first positioning plate is connected to the positioning disc, and the rotating disc is in clearance fit with the positioning disc. An end of the rotating disc far away from the positioning disc is fixedly connected to the roller tube. A positioning column is arranged on the first positioning plate, and a positioning hole cooperating with the positioning column is arranged on the positioning disc. After installation, the positioning disc cannot be rotated due to the cooperation of the positioning column and the positioning hole. The positioning column can be a circular column. Clamping protrusions are evenly distributed on the outer circumferential surface of the positioning column. The shape of the positioning hole corresponds to the positioning column. Of course, the positioning column can also be a polygon or other shapes.

Preferably, the cordless roller blind further includes an adjusting device for adjusting a pre-tightening force of the coil spring. The adjusting device includes a fixing tube fixedly connected to one end of the coil spring and an adjusting disc fixedly connected to the other end of the coil spring. The fixing tube is located in the roller tube and fixed to the roller tube. The adjusting disc is fixed at an end of the roller tube. The adjusting device further includes a positioning piece and a second positioning plate, wherein the positioning piece and the second positioning plate are configured to cooperate with the adjusting disc. The fixing tube is fixed to the roller tube, and the fixing tube rotates synchronously with the roller tube, so that one end of the coil spring is wound to produce different torsion forces. The other end of the coil spring is fixed on the adjusting disc, and after the adjusting device is installed on the roller blind, the adjusting disc is fixed on the second positioning plate, that is, the adjusting disc remains stationary.

Preferably, the adjusting disc is located outside the roller tube and can be adjusted directly by hands or with a tool. An adjusting structure of the adjusting disc is located between the roller tube and the second positioning plate.

Preferably, a positioning rod is arranged between the fixing tube and the adjusting disc, and the coil spring is sleeved on the positioning rod. The positioning rod supports the coil spring, and can also determine the distance between the fixing tube and the adjusting disc, which is convenient for positioning the fixing tube.

Preferably, clamping teeth are distributed on an edge of the adjusting disc, and a clamping handle cooperating with the clamping teeth is arranged on the positioning piece. The position where the clamping teeth are clamped is selected to adjust the initial position of the coil spring to determine the torsion force.

Preferably, a mounting plate is arranged between the first positioning plate in the brake device and the second positioning plate in the adjusting device. The mounting plate is arranged for the convenience of the integrated installation of the brake device and the adjusting device, that is, the brake device and the adjusting device on both sides of the mounting plate are separately pre-installed, and then wholly assembled to the roller blind. The pre-tightening force of the coil spring can also be pre-adjusted for installation.

Preferably, a pin cooperating with a slot is arranged on the first positioning plate and the second positioning plate, respectively. The relative position of the first positioning plate and the second positioning plate is adjusted through the cooperation of the pin and the slot.

Preferably, the blind fabric includes a fabric and a bottom rod located at the lower end of the fabric.

Therefore, the cordless roller blind of the present invention has the following advantages. With respect to the whole roller blind, the blind fabric can be lowered as required in use, and after being lowered to the desired position, the blind fabric can be self-locked. In the locking process, the torque of the coil spring, the friction between the rotating disc and the positioning disc, and the weight of the hanging portion of the blind fabric are balanced to prevent other components of the roller blind from being loaded.

In the figures: 1—roller tube, 2—blind fabric, 3—mounting plate, 4—brake device, 5—adjusting device, 6—first positioning plate, 7—positioning disc, 8—positioning groove, 9—friction ring, 10—rotating disc, 11—positioning column, 12—clamping bump, 13—positioning hole, 14—adjusting disc, 15—clamping teeth, 16—positioning piece, 17—clamping handle, 18—second positioning plate, 19—pin, 20—positioning rod, 21—fixing tube, 22—bottom rod, 23—coil spring, 24—connecting disc, 25—connecting column.

DETAILED DESCRIPTION OF THE EMBODIMENTS

The technical solution of the present invention is further described in detail below in conjunction with the embodiments and drawings.

Embodiment 1

Figure 1:
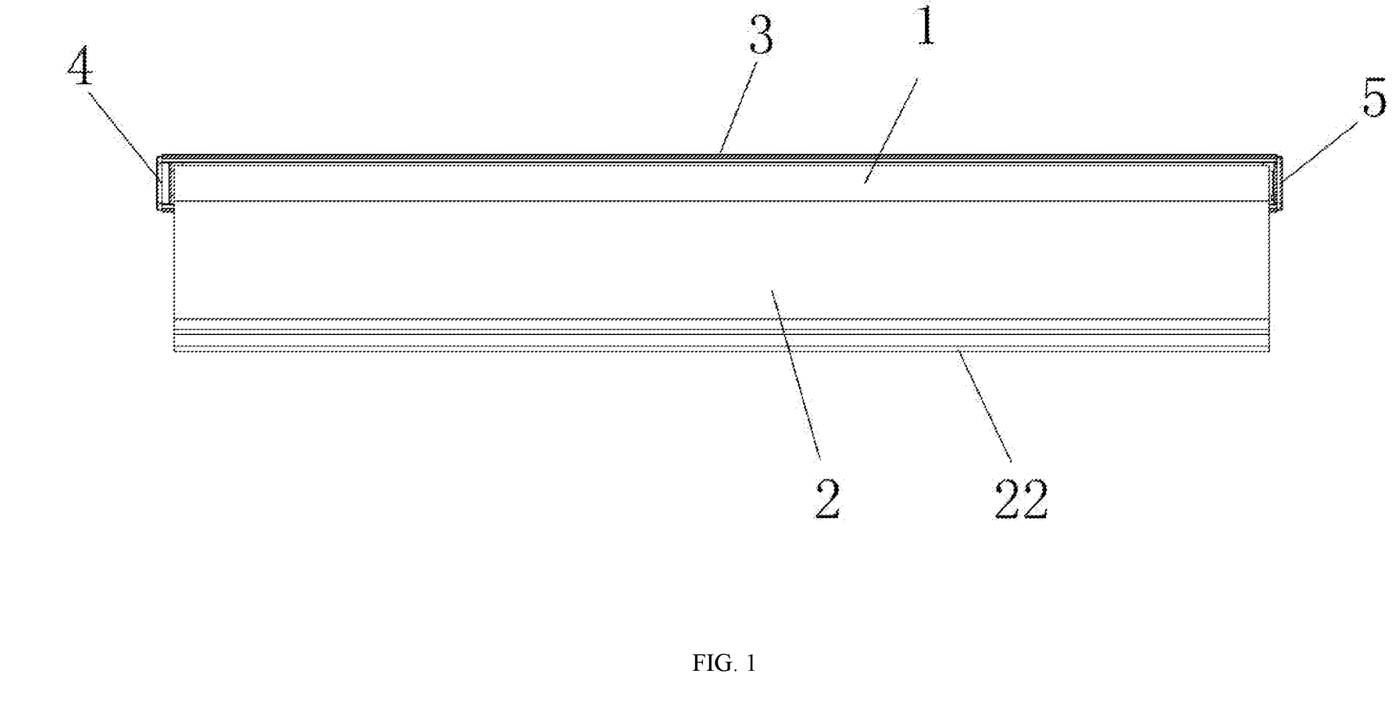
FIG. 1 is a schematic diagram of the structure of the present invention.

As shown in FIG. 1, a cordless roller blind includes the roller tube 1 provided with the coil spring therein and the blind fabric wound around the roller tube. The blind fabric includes a fabric and a bottom rod located at the lower end of the fabric. The cordless roller blind further includes the brake device 4 for realizing the rotation and self-locking of the roller tube, and the adjusting device 5 for adjusting the pre-tightening force of the coil spring. The brake device is located at one end of the roller tube, and the adjusting device is located at the other end of the roller tube. Of course, the adjusting device and the brake device can be arranged at the same end.

Figure 2:
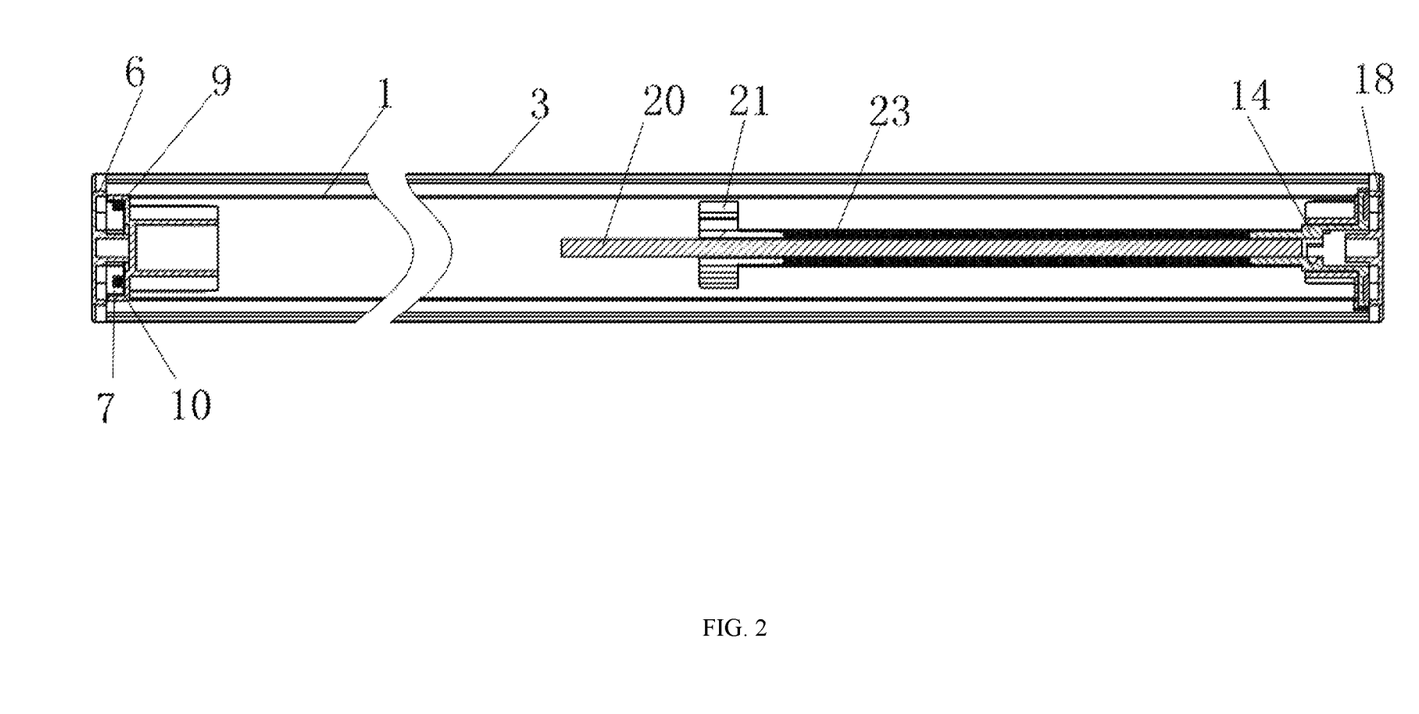
FIG. 2 is a cross-sectional view of the structure in FIG. 1 without the blind fabric.
Figure 3:
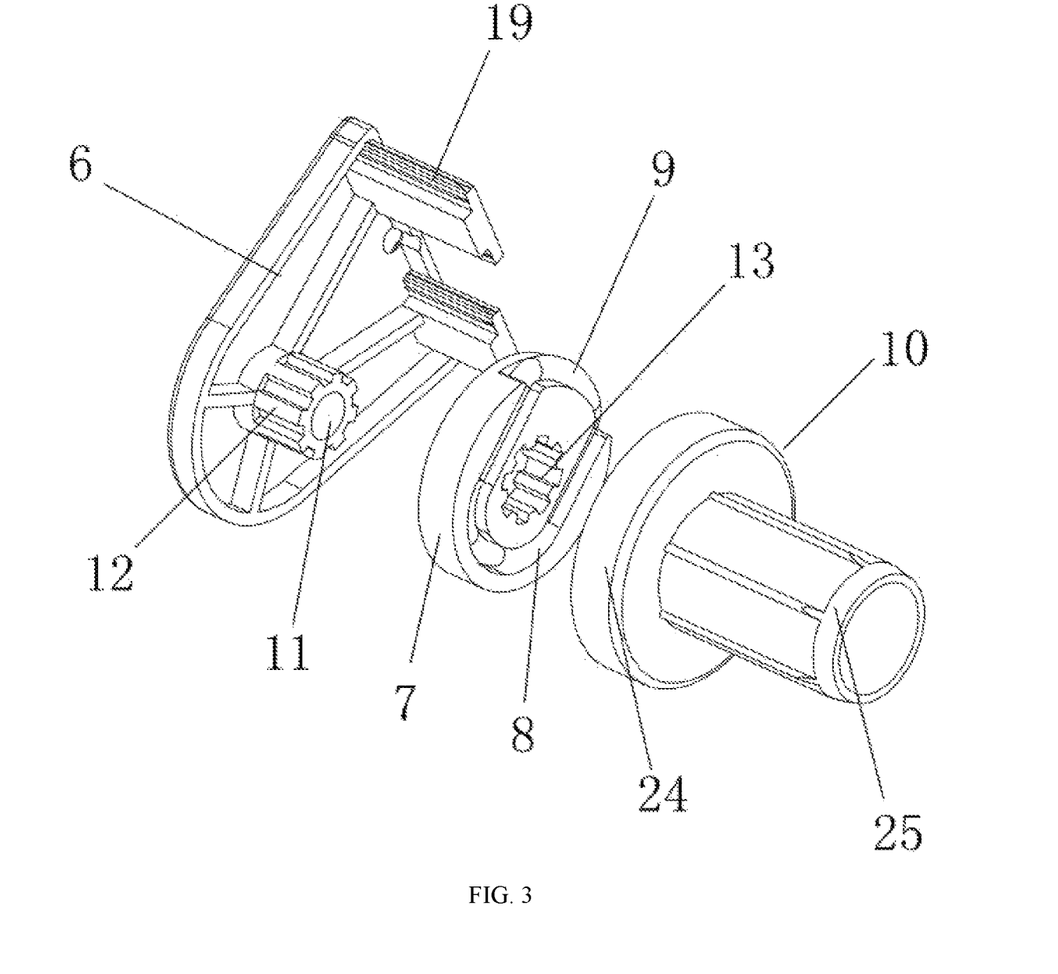
FIG. 3 is an explosive diagram of the brake device in the present invention.
Figure 4:
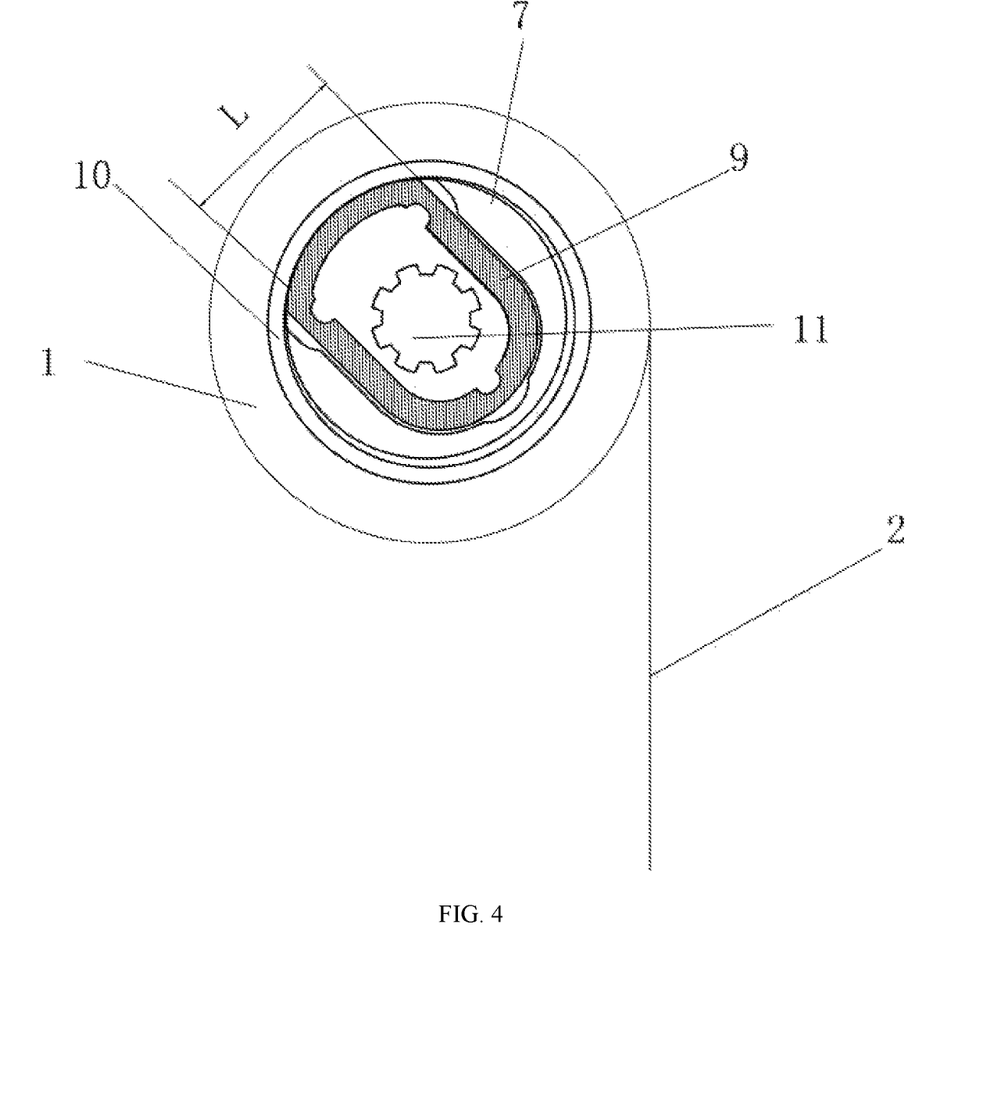
FIG. 4 is a cross-sectional view showing the cooperation of the rotating disc and the positioning disc in FIG. 3.

As shown in FIGS. 2-4, the brake device includes the first positioning plate 6 vertically connected to the axis of the roller tube, the positioning disc 7 fixedly connected to the first positioning plate, and the rotating disc 10 sleeved on the outside of the positioning disc. The rotating disc is in clearance fit with the positioning disc. The rotating disc includes the connecting disc 24 and the connecting column 25 which are integrated with each other. The connecting disc 24 is sleeved on the outside of the positioning disc 7. Protrusions are evenly distributed on the outer surface of the connecting column 25. The connecting column 25 is inserted into the roller tube 1 and is fixed to the inner wall of the roller tube through the protrusions, so that the rotating disc 10 rotates synchronously with the roller tube 1.

The positioning column 11 is integrated at the lower part of the first positioning plate 6. A clamping protrusion is integrated at the outer circumferential surface of the positioning column 11. The shape of the positioning hole of the positioning disc 7 is identical to the shape of the positioning column, thereby ensuring that the positioning disc 7 is fixed on the first positioning plate 6. The positioning groove 8 is arranged on the end face of the positioning disc, and the positioning groove is U-shaped. A friction ring is installed in the positioning groove. The positioning disc and the friction ring are made of different materials and have different friction coefficients.

During installation, the positioning disc 7 and the rotating disc 10 are concentrically arranged. After the rotating disc 10 is inserted into the roller tube 1, since the blind fabric 2 is wound around the roller tube 1, the rotating disc is subjected to pressure from the weight of the blind fabric. Consequently, the rotating disc is eccentric with the positioning disc, and the rotating disc 10 is in contact with the positioning disc 7 and the friction ring 9 on the positioning disc. The length of the contact portion L determines the magnitude of the friction.

Figure 5:
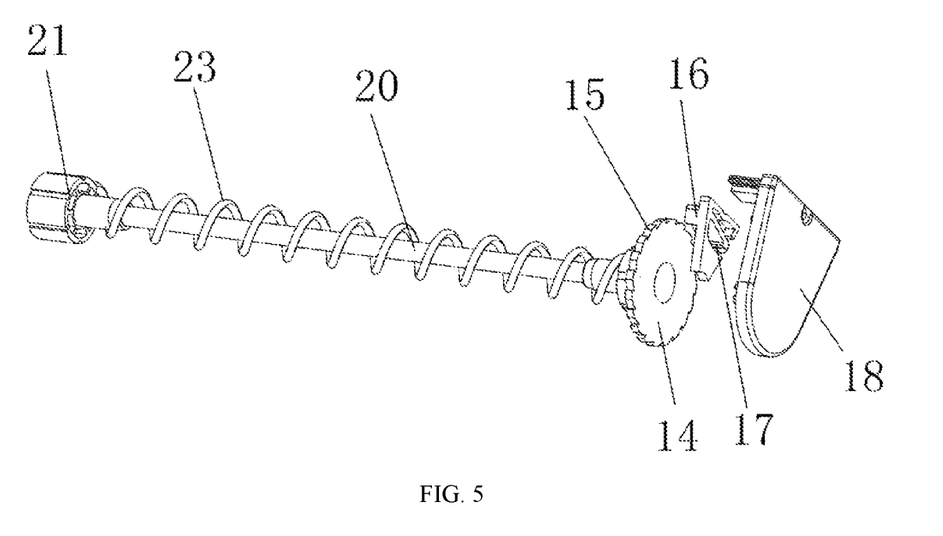
FIG. 5 is an explosive diagram of the adjusting device in the present invention.

As shown in FIG. 5, the adjusting device includes the coil spring 23. One end of the coil spring 23 is fixed on the fixing tube 21, and the other end of the coil spring 23 is fixed on the adjusting disc 14. The clamping teeth 15 are integrated at the outer circumferential surface of the adjusting disc 14. A clamping handle is arranged on one side of the adjusting disc, and the positioning piece 16 is integrated on the clamping handle. The clamping teeth 15 are clamped by the positioning piece to prevent the adjusting disc from rotating. The fixing tube 21 and the adjusting disc 14 are connected by the positioning rod 20, and the coil spring is sleeved on the positioning rod 20. The fixing tube 21 is located in the roller tube 1, and the fixing tube 21 rotates synchronously with the roller tube 1, thereby driving one end of the coil spring 23 to twist and generate a torsion force. The adjusting disc is located outside the roller tube. The second positioning plate 18 is arranged on the outside of the adjusting disc. A fixing protrusion is arranged on the second positioning plate, and the positioning piece 16 is fixed on the second positioning plate 18. Moreover, a circular positioning column is arranged in the lower part of the second positioning plate 18. A positioning hole is arranged in the center of the adjusting disc. The adjusting disc and the second positioning plate are connected together through the cooperation between the positioning column and the positioning hole.

The first positioning plate 6 and the second positioning plate 18 are connected through the mounting plate 3. The pin 19 is integrated on the first positioning plate 6 and the second positioning plate 18, respectively. The pin 19 is inserted into the mounting plate, thereby connecting the first positioning plate and the second positioning plate with the mounting plate.

The brake device and the adjusting device are pre-installed and adjusted before being installed on the roller blind. The positioning disc and the rotating disc of the brake device are concentrically arranged. The initial torsion force of the coil spring is predetermined. The positioning piece tightly clamps the clamping teeth of the adjusting disc. The brake device is installed on the first positioning plate, and the adjusting device is installed on the second positioning plate. Then, the first positioning plate and the second positioning plate are connected through the mounting plate and are wholly installed on the roller blind.

The end of the rotating disc is inserted into one end of the roller tube, and the fixing tube is inserted into the other end of the roller tube. Due to the weight of the blind fabric on the roller tube, the rotating disc is pressed to the positioning disc, so that the rotating disc is eccentric with the positioning disc. Friction is produced due to the pressure of the contact portion between the rotating disc and the positioning disc, and between the rotating disc and the friction member on the positioning disc, and the maximum static friction of the brake device is constant. In the absence of external force, the torsion force of the coil spring, the friction provided by the brake device and the weight of a hanging portion of the blind fabric are mutually balanced, so that the blind fabric remains stationary.

When the blind fabric needs to be raised or lowered to adjust its position, an external force is applied to the blind fabric, which upsets the balanced state. The external force is greater than the maximum static friction, so that the blind fabric can be adjusted, and the friction is variable during the winding process of the blind fabric. When the external force pushes the blind fabric to move upward, the pressure acting on the brake device decreases as the external force offsets the weight of the blind fabric, and the friction decreases accordingly, and the torsion force of the coil spring drives the blind fabric to wind up. When the blind fabric is held in place, the external force disappears, and due to the action of the friction, the torsion force of the coil spring, the friction provided by the brake device and the weight of the hanging portion of the blind fabric are mutually balanced again, making the blind fabric stationary.

The blind fabric is wound through the roller tube. When the blind fabric does not need to be lowed, the bottom rod is raised, and the coil spring can drive the roller tube to rotate, wind and retract the blind fabric. When the blind fabric needs to be lowered, the blind fabric can be lowed to the desired position only by pulling the blind fabric itself. When the blind fabric is held in the desired position, the torque of the coil spring, the friction between the rotating disc and the positioning disc, and the weight of the hanging portion of the blind fabric are balanced, so that the blind fabric is self-locked in the desired position. When the blind fabric is used for a period of time, the tightness of the coil spring changes, and the pre-tightening force of the coil spring can be adjusted by the adjusting device to ensure that the pre-tightening force can just cause the roller tube to rotate. With respect to the whole roller blind, the blind fabric can be lowered as required in use, and after being lowed to the desired position, the blind fabric can be self-locked. In the locking process, the torque of the coil spring, the friction between the rotating disc and the positioning disc, and the weight of the hanging portion of the blind fabric are balanced to prevent other components of the roller blind from being loaded.

The first positioning plate is configured to fix the positioning disc and the rotating disc. The rotating disc is sleeved on the outside of the positioning disc and is in clearance fit with the positioning disc. When the blind fabric is pulled down, the blind fabric drives the roller tube to rotate, and the roller tube can drive the rotating disc to rotate relatively to the positioning disc. When the blind fabric is pulled down to the desired position, the blind fabric is released, and the weight of the blind fabric acts on the rotating disc, so that the rotating disc is subjected to a down-pull force, and meanwhile, the rotating disc is eccentric with the positioning disc. When the rotating disc is eccentric with the positioning disc, the inner wall of the rotating disc is tightly in contact with the positioning disc and the friction ring to generate the friction, and the torque of the coil spring, the friction between the rotating disc and the positioning disc, and the weight of the hanging portion of the blind fabric are balanced, so that the rotating disc and the roller tube stop rotating, and the blind fabric is self-locked in the desired position. When the blind fabric needs to be retracted, it is only necessary to lightly lift the blind fabric from bottom to top, the weight of the blind fabric decreases, the down-pull force acting on the rotating disc decreases accordingly, the rotating disc is nearly concentric with the positioning disc, and the friction between the rotating disc and the positioning disc decreases. At this time, the torque of the coil spring can drive the roller tube to rotate and retract the blind fabric. The whole device realizes the self-locking and retraction of the blind fabric through the difference in the weight of the blind fabric acting on the rotating disc, the difference in the eccentric direction between the rotating disc and the positioning disc, the difference in the friction between the positioning disc, the friction member and the inner wall of the rotating disc, and the difference in the torque of the coil spring. The positioning groove is arranged on the end surface of the positioning disc, and a friction ring is arranged at the positioning groove. When the friction ring is embedded in the positioning groove, the side of the friction ring far away from the axis of the positioning disc includes a section exposed outside the positioning groove, and this section can protrude from the edge of the positioning disc. The protruding portion can be used to realize the friction with the inner wall of the rotating disc when the rotating disc is eccentric with the positioning disc. The positioning groove is U-shaped. When the friction ring is embedded in the positioning groove, the opening of the U-shaped positioning groove is exactly the portion of the friction ring protruding from the positioning disc.

The positioning column is perpendicularly arranged on the first positioning plate. A plurality of clamping protrusions are radially arranged at the outer surface of the positioning column, the clamping bumps are arranged along the axis of the positioning column and distributed around the axis of the positioning column. The positioning hole is arranged on the positioning disc. When the positioning column is inserted into the positioning hole, the positioning hole can limit the positioning column through the clamping protrusion, thereby realizing the coaxial fixation between the first positioning plate and the positioning disc and ensuring that the positioning disc and the first positioning plate are relatively static when the rotating disc rotates relative to the positioning disc. The adjusting device includes the adjusting disc and the positioning piece. The adjusting disc and the positioning piece are connected together through a second positioning plate. The clamping teeth are distributed on the outer edge of the adjusting disc. The clamping handle cooperating with the clamping teeth is arranged on the positioning piece, and the clamping handle is in a static state relative to the second positioning plate. When the pre-tightening force of the coil spring needs to be increased, the clamping teeth drives the coil spring to rotate to increase the pre-tightening force of the coil spring provided that the adjusting disc is rotated.

At this time, the clamping handle does not cause a limit or interference to the clamping teeth. When the adjustment is completed, the adjusting disc is released, the reversed torque of the adjusting disc acts on the clamping teeth, and the clamping handle supports the clamping teeth to limit the position of the clamping teeth to realize the fixation of the pre-tightening force of the coil spring. When the pre-tightening force of the coil spring needs to be decreased, the positioning disc only needs to be rotated and separate from the adjusting disc, the clamping handle is detached from the clamping teeth, and the coil spring drives the adjusting disc to reverse and decrease the pre-tightening force of the coil spring. The coil spring is wound on the positioning rod.

One end of the coil spring is fixed on the adjusting disc, and the other end of the coil spring is fixed on the fixing tube. The coil spring is twisted by means of the relative rotation difference between the fixing tube and the adjusting disc. The mounting plate is arranged between the brake device and the adjusting device, and the roller blind is fixed to the wall or ceiling through the mounting plate. In addition, the brake device and the adjusting device are fixed to each other through the mounting plate, so as to enhance the coaxiality of the brake device and the adjusting device, and avoid the uncoordinated torque between the two ends of the roller tube caused when the torque of the brake device is opposite to the torque of the adjusting device. The bottom rod is arranged at the lower end of the blind fabric. The bottom rod can facilitate pulling the blind fabric by hand, and also increases the weight of the blind fabric to facilitate adjusting the cooperation relationship between the self-weight of the blind fabric, the friction produced by the brake device and the torque produced by the coil spring. The hanging side of the blind fabric can be either near the window or away from the window, which can be adjusted according to the actual installation needs. Meanwhile, the position of the brake device is adjusted according to the direction of the hanging side of the blind fabric.

What is claimed is:

1. A cordless roller blind, comprising a roller tube, a blind fabric wound around the roller tube and a brake device, wherein, a coil spring is arranged in the roller tube, and a torsion force of the coil spring changes as the roller tube rotates; the torsion force of the coil spring, friction provided by the brake device and a weight of a hanging portion of the blind fabric are mutually balanced, and the blind fabric remains stationary at any position without an external force and wherein the brake device comprises a rotating disc and a positioning disc in the rotating disc; the rotating disc rotates relative to the positioning disc, and the friction of the brake device is provided by friction between the rotating disc and the positioning disc after a mechanical contact between the rotating disc and the positioning disc.

2. The cordless roller blind of claim 1, wherein, the friction of the brake device is adjustable, and the friction in the brake device is adjusted according to weight of different blind fabrics.

3. The cordless roller blind of claim 1, wherein, the friction of the brake device is variable in a winding process of the blind fabric; when the external force pushes the blind fabric to move upward, pressure acting on the brake device decreases as the external force offsets the weight of the blind fabric, and the friction of the brake device decreases accordingly, and the torsion force of the coil spring drives the blind fabric to wind up.

4. The cordless roller blind of claim 1, wherein, a number of the brake device is at least one.

5. The cordless roller blind of claim 1, wherein, the positioning disc is made of at least one wear-resistant material with a friction coefficient; the friction between the positioning disc and the rotating disc depends on the friction coefficient of the at least one material of a portion of the positioning disc, and the portion of the positioning disc is in contact with the rotating disc.

6. The cordless roller blind of claim 1, wherein, the brake device comprises a rotating disc and a positioning disc in the rotating disc; at least one friction member is arranged between the positioning disc and the rotating disc; the rotating disc rotates relative to the positioning disc; the friction of the brake device comprises friction between the rotating disc and the at least one friction member, and friction between the rotating disc and the positioning disc; the friction between the rotating disc and the positioning disc is greater than or equal to zero.

7. The cordless roller blind of claim 6, wherein, the friction of the brake device is adjusted by adjusting a relative angle between the rotating disc and the positioning disc.

8. The cordless roller blind of claim 6, wherein, a friction coefficient of the positioning disc is different from a friction coefficient of the at least one friction member.

9. The cordless roller blind of claim 1, wherein, the brake device further comprises a first positioning plate; the first positioning plate is connected to the positioning disc, and the rotating disc is in clearance fit with the positioning disc; a side of the rotating disc is far-away-spaced from the positioning disc, and the side of the rotating disc is fixedly connected to the roller tube.

10. The cordless roller blind of claim 9, wherein, a positioning column is arranged on the first positioning plate, and a positioning hole cooperating with the positioning column is arranged on the positioning disc.

11. The cordless roller blind of claim 1, further comprising an adjusting device for adjusting a pre-tightening force of the coil spring; the adjusting device comprises a fixing tube and an adjusting disc; the fixing tube is fixedly connected to a first end of the coil spring, and the adjusting disc is fixedly connected to a second end of the coil spring; the fixing tube is located in the roller tube and fixed to the roller tube; the adjusting disc is fixed at an end of the roller tube.

12. The cordless roller blind of claim 11, wherein, the adjusting device further comprises a positioning piece and a second positioning plate, and the positioning piece and the second positioning plate are configured to cooperate with the adjusting disc.

13. The cordless roller blind of claim 12, wherein, the adjusting disc is located outside the roller tube and is adjusted by hands or with a tool; an adjusting structure of the adjusting disc is located between the roller tube and the second positioning plate.

14. The cordless roller blind of claim 11, wherein, a positioning rod is arranged between the fixing tube and the adjusting disc, and the coil spring is sleeved on the positioning rod.

15. The cordless roller blind of claim 12, wherein, clamping teeth are distributed on an edge of the adjusting disc, and a clamping handle cooperating with the clamping teeth is arranged on the positioning piece.

16. The cordless roller blind of claim 12, wherein, a mounting plate is arranged between a first positioning plate in the brake device and the second positioning plate in the adjusting device.

17. The cordless roller blind of claim 16, wherein, a slot is arranged on the mounting plate, and a pin cooperating with the slot is arranged on the first positioning plate and the second positioning plate, respectively.

18. The cordless roller blind claim 1, wherein, the blind fabric comprises a fabric and a bottom rod located at a lower end of the fabric.

* * * * *